United States Patent [19]

Few

[11] Patent Number: 5,535,849

[45] Date of Patent: Jul. 16, 1996

[54] HAND HELD TRANSMISSION FLUID CHANGER

[75] Inventor: Jeffrey P. Few, Elkhart, Ind.

[73] Assignee: Flo-Dynamics, Inc., Compton, Calif.

[21] Appl. No.: 403,180

[22] Filed: Mar. 13, 1995

[51] Int. Cl.$^6$ .................................................. F16N 33/00
[52] U.S. Cl. ..................... 184/1.500; 184/6.4; 184/96; 184/104.3; 184/108; 141/94; 141/98
[58] Field of Search ........................... 184/1.5, 6.4, 96, 184/97, 104.3, 108; 141/59, 94, 98; 251/6, 152

[56] References Cited

U.S. PATENT DOCUMENTS

| | | |
|---|---|---|
| 1,655,939 | 1/1928 | Copeland . |
| 1,815,221 | 7/1931 | Sweetland . |
| 1,829,173 | 10/1931 | Wertz . |
| 1,884,820 | 10/1932 | Osborne . |
| 2,320,048 | 5/1943 | Parson . |
| 2,499,705 | 3/1950 | Vokes . |
| 3,140,756 | 7/1964 | Dinkelkamp . |
| 3,216,527 | 11/1965 | Lewis . |
| 3,447,636 | 6/1969 | Bonfilo . |
| 3,513,941 | 5/1970 | Becnel . |
| 3,720,287 | 3/1973 | Martel . |
| 3,867,999 | 2/1975 | Cox . |
| 3,964,511 | 6/1976 | Cattermole ........................ 251/149.9 |
| 4,095,672 | 6/1978 | Senese . |
| 4,095,673 | 6/1978 | Takeuchi . |
| 4,128,140 | 12/1978 | Riches . |
| 4,331,185 | 5/1982 | Rinaldo et al. . |
| 4,674,456 | 6/1987 | Merritt . |
| 4,745,989 | 5/1988 | DiMatteo . |
| 4,807,674 | 2/1989 | Sweet . |
| 4,869,346 | 9/1989 | Nelson . |
| 4,938,315 | 7/1990 | Ohta et al. . |
| 4,951,784 | 8/1990 | Bedi . |
| 4,976,235 | 12/1990 | Commanday ......................... 184/1.5 |
| 5,056,621 | 10/1991 | Trevino . |
| 5,062,398 | 11/1991 | Bedi et al. . |
| 5,062,500 | 11/1991 | Miller et al. . |
| 5,090,458 | 2/1992 | Creeron . |
| 5,092,429 | 3/1992 | Linares et al. . |

(List continued on next page.)

FOREIGN PATENT DOCUMENTS

| | | | |
|---|---|---|---|
| 2-72299 | 3/1990 | Japan | ........................................ 184/1.5 |
| 2-116499 | 1/1992 | Japan . | |

OTHER PUBLICATIONS

Document intended to promote Oribs ATF Changer and what purports to be English translation thereof (no date).
Document relating to Tatsuno ATF Changer (no date).
Documents from Yamada Corporation relating to various apparatus and what purports to be English translation thereof (no date).
Brochure from Engine Solution (no date).
Purported brochure for an Automatic Transmission Changer from Lih Yann Corporation, printed in Chinese, as well as various other documents printed in foreign languages, and what purports to be English translation thereof.
Set of instructions purportedly utilized by employees of Grease Monkey of Denver, Colorado (no date).

*Primary Examiner*—Edward K. Look
*Assistant Examiner*—Christopher Verdier
*Attorney, Agent, or Firm*—Fulwider Patton Lee & Utecht

[57] ABSTRACT

A hand held transmission fluid changer includes a compact housing internally plumbed with a pair of open ended drain and supply tubes for connection at respective first ends with the first ends of a pair of hoses connected at their opposite ends with remote waste and unused fluid tanks. The respective tubes include respective second ends for connection with a second pair of tubes leading to respective upstream and downstream transmission components for, respectively, withdrawing used fluid from and introducing unused fluid to a transmission. A demand pump is connected in fluid circuit with the supply hose to flow unused fluid from the unused fluid tank to the supply tube. A pair of flow control valves are disposed in the respective tubes to allow the operator to adjust and match the respective flow rates through such tubes.

20 Claims, 4 Drawing Sheets

U.S. PATENT DOCUMENTS

| | | |
|---|---|---|
| 5,148,785 | 9/1992 | Sendak . |
| 5,289,837 | 3/1994 | Betancourt . |
| 5,291,968 | 3/1994 | Brown . |
| 5,318,080 | 6/1994 | Viken . |
| 5,370,160 | 12/1994 | Parker ......................................... 141/98 |
| 5,372,219 | 12/1994 | Peralta . |
| 5,390,762 | 2/1995 | Nelson . |
| 5,427,202 | 6/1995 | Behring et al. . |
| 5,429,159 | 7/1995 | Tees et al. ................................. 141/59 |
| 5,447,184 | 9/1995 | Betancourt ................................ 184/1.5 |

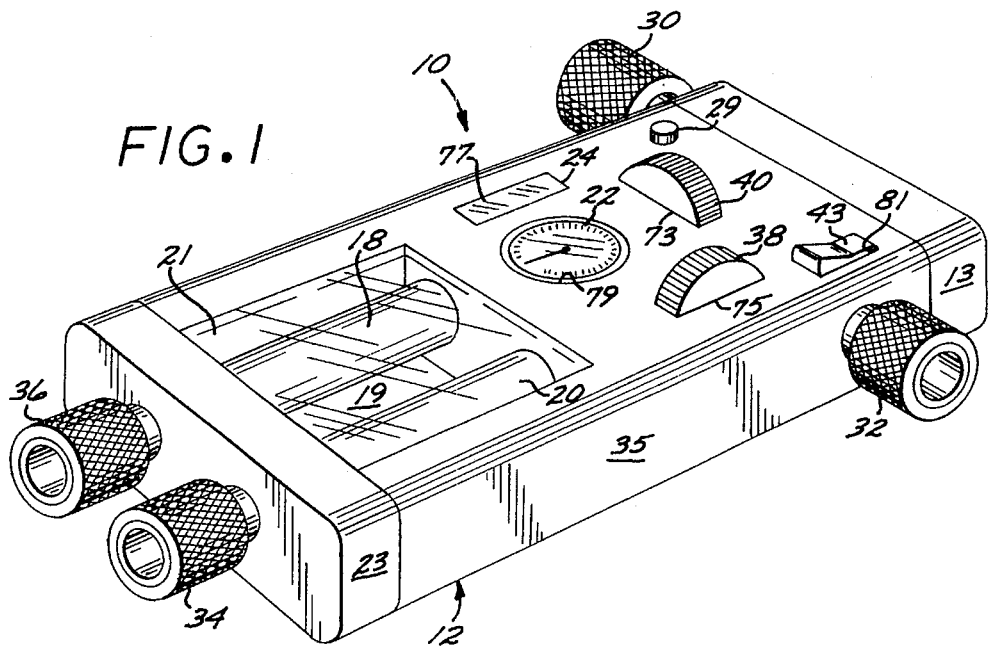
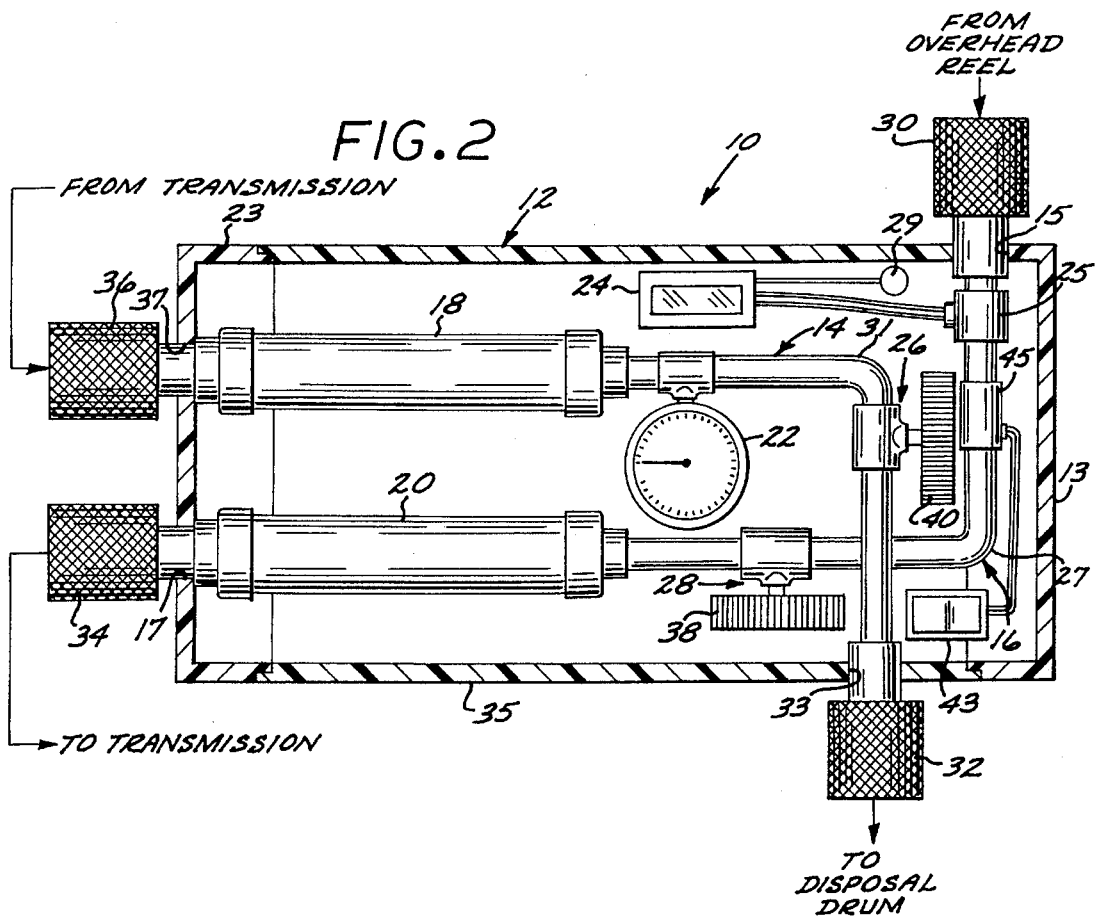

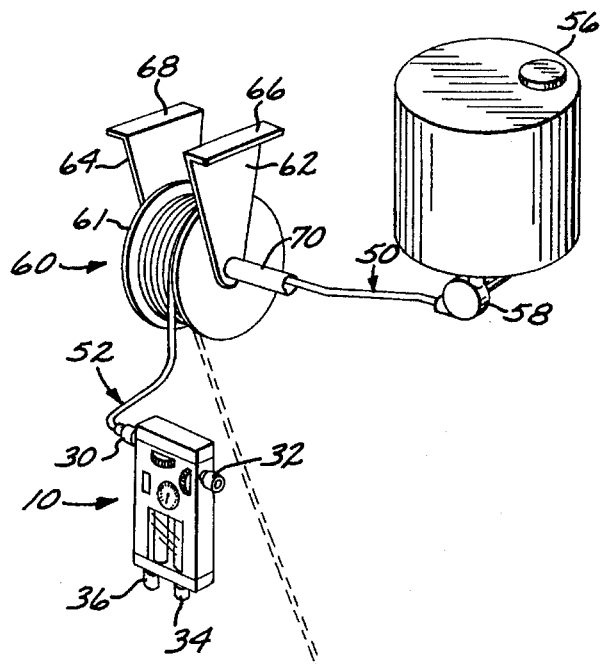
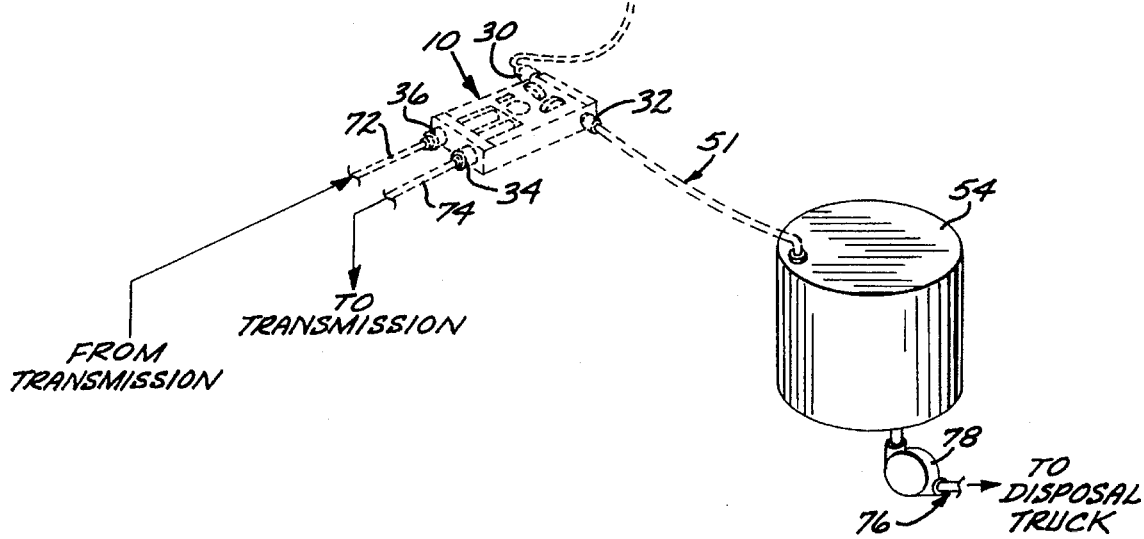
FIG.3

HAND HELD TRANSMISSION FLUID CHANGER

BACKGROUND OF THE INVENTION

1. Field of the Invention

The present invention relates to fluid exchanging apparatus and, more particularly, to a hand held control device for performing a simultaneous exchange of transmission fluid in an automatic transmission.

2. Description of the Prior Art

Automatic transmissions require transmission fluid because such fluid is employed in part as a driving means within the transmission and is additionally employed to lubricate the internal components within such transmissions. Over time such fluid becomes less viscous and thus less efficient in lubricating such components. It is therefore desirable to periodically perform an exchange of fluid to maintain the viscosity of such fluid within the transmission and to maintain the cleanliness of the transmission and thereby increase the useful life of the transmission. A complete exchange of fluid is preferred so that the used fluid as well as undesirable foreign matter contained therein is completely removed and is replaced with new, more viscous fluid.

There has been a long standing need for a device which may efficiently perform a simultaneous, substantially complete exchange of transmission fluid in an automatic transmission while at the same time posing minimum risk to the transmission. The conventional method, still widely practiced today, is to replace the fluid housed in the pan of the transmission. The pan typically holds from 1 to 5 quarts of the total 7 to 15 quart capacity of the transmission. Thus emptying the pan and then adding that amount of new fluid only serves to dilute the used fluid with some 15–25% of new fluid. Hence this conventional service is inefficient since it only serves to mix new fluid with a large quantity of used fluid. Furthermore, this service requires the removal of the transmission fluid pan from the transmission for emptying of the fluid therefrom and replacement of the pan on the transmission housing. This can prove to be a messy and time consuming process. Furthermore, the pan is often not replaced squarely over the pan seal or, on occasion, will trap small foreign obstacles in the seal area resulting in leakage.

More recently, there have been efforts to make a complete exchange of all the fluid in an automobile's transmission by disconnecting a fluid tube and draining the fluid into a waste oil dump while manually pouring new fluid into the transmission dipstick tube. This procedure has proven to be inefficient, inadequate and so time consuming that it has failed to gain broad acceptance.

Another method proposed involves disconnecting a transmission fluid cooler line to allow one disconnected end to drain freely, while the other end is connected to a relatively large pressurized bulk storage tank to inject unused fluid into the cooler line to refill the transmission. One major disadvantage associated with this method is that, in many instances, the rate at which fluid is withdrawn from the transmission is not matched by the rate of refill. As such, there is a risk that the fluid level in the transmission will drop dangerously low resulting in possible damage to the transmission pump, fluid seals, rear bearings or other internal components of the transmission. This difficulty is compounded by the fact that the flow resistance through the transmission varies with the different models of transmissions.

Another device proposed in attempt to provide for an efficient fluid exchange includes a drain hose wound on a retractable reel and connected on its free end to a drain funnel for placement beneath the vehicle oil drain pan opening for withdrawal of oil by gravity into such funnel. Such a device is shown in U.S. Pat. No. 3,140,756 to Dinkelkamp. A suction pump connected to the drain hose serves to flow such withdrawn oil to a remote waste oil tank. This device contemplates that the operator will completely drain the used oil from the engine, replace the drain plug, and manually refill the engine with unused fluid. This apparatus has not gained acceptance as a transmission fluid changer in that it fails to provide for simultaneous exchange of fluid and requires that the operator manually refill the crankcase.

Yet another device proposed in an attempt to facilitate fluid removal and replacement in an automobile fluid system includes a switching control device permanently mounted to an engine oil system, such a device being described in U.S. Pat. No. 5,056,621 to Trevino. This device includes a pump to be mounted to the engine block and a pair of input suction conduits for connection to, respectively, an oil drain port and to a source of unused oil. The device includes a switch which allows for the selection of the conduit through which fluid may flow and a pump to draw fluid through the selected conduit. An output conduit is also provided with a free end for releasable connection to a waste oil tank when the switch is in the position to flow fluid from the oil drain port, and is releasably connected to an oil filler tube when the switch is placed in the position to allow fluid to flow from the source of unused fluid. Thus devices of this type have not gained acceptance for changing transmission fluid in that they do not provide for the simultaneous exchange of fluid, are burdensome to use and time consuming because, in order to switch such a device between withdrawing and replacing fluid, the operator must manually remove the output conduit from the waste oil tank and connect such conduit to the vehicle's oil filler tube.

Other work in this field has led to the proposal of a transmission fluid changer including air pressurized tanks for supply and extraction of transmission fluid via the transmission cooler lines. A device of this type is shown in U.S. Pat. No. 5,318,080 to Viken. Such devices are rather cumbersome, require connection with a pressure hose which acts as an umbilical cord thus committing such cord on a dedicated basis and resulting in the inconvenience of the device being tethered to such cord and restricting manipulation thereof. Such devices have not gained acceptance in the marketplace.

Further efforts have led to a portable device which may perform a simultaneous, substantially complete exchange of transmission fluid. Such a device is shown in U.S. Pat. No. 5,370,160 to Parker who has granted the rights therein to the assignee of the rights in the present invention. Such a device may be utilized to adjust flow rates of the fluids being withdrawn from and introduced to the transmission. This device, while having gained acceptance in the field, suffers the shortcoming that it is bulky, occupies a substantial amount of floor space during use and is somewhat expensive to manufacture.

As such, it may be appreciated that there continues to be a need for an automatic transmission fluid exchanging device which is so compact it could be held in a user's hand but yet being operative to efficiently replace substantially all the used fluid in an automatic transmission. The instant invention addresses such needs.

SUMMARY OF THE INVENTION

Briefly, and in general terms, the present invention is in the form of a lightweight hand held transmission fluid changer comprising a relatively compact housing internally plumbed with a pair of open ended supply and drain tubes having respective inlet and outlet couplings attached thereto. Respective hoses defining supply and drain hoses leading, respectively, from a supply tank and to a drain tank may be connected to the respective supply inlet coupling and drain outlet coupling. In one embodiment, the supply hose is wound on a spring loaded retractable overhead reel thereby suspending the hand held transmission fluid changer therefrom. The overhead reel may be mounted above a car service bay or the like. When the hand held transmission fluid changer is to be used the drain inlet and supply outlet of the hand held transmission fluid changer may be releasably connected to a pair of tubes leading, respectively, from a disconnected transmission fluid cooler line and to a cooler port on the vehicle's radiator to which the fluid cooler line is normally connected. A demand pump is provided and serves to flow unused fluid from the remote unused fluid tank through the supply hose to the supply tube. The transmission fluid pump is conveniently utilized to pump used fluid through the disconnected cooler line to the drain tube. The hand held transmission fluid changer further includes in one embodiment respective pairs of sight glasses and manual flow control valves in the respective drain and supply tubes. The sight glasses provide for the visual inspection of the fluid in the respective tubes, and the flow control valves allow for the operator to match the flow rates through the respective tubes so that a simultaneous, complete exchange of fluid may be performed.

In a second embodiment, pressure sensing circuitry is provided to control electric powered flow control valves to balance the flow rate or quantity through the respective inlet and outlet flow tubes.

DESCRIPTION OF THE DRAWINGS

FIG. 1 is a perspective view of a hand held transmission fluid changer embodying the present invention;

FIG. 2 is a partial horizontal sectional view, in enlarged scale, of the hand held transmission fluid changer shown in FIG. 1;

FIG. 3 is a perspective view, in reduced scale and partially in phantom, of the hand held transmission fluid changer of the present invention suspended from an overhead reel and connected to respective tubes which lead to respective remote waste and unused fluid tanks;

DETAILED DESCRIPTION OF THE PREFERRED EMBODIMENT

Figure 4:
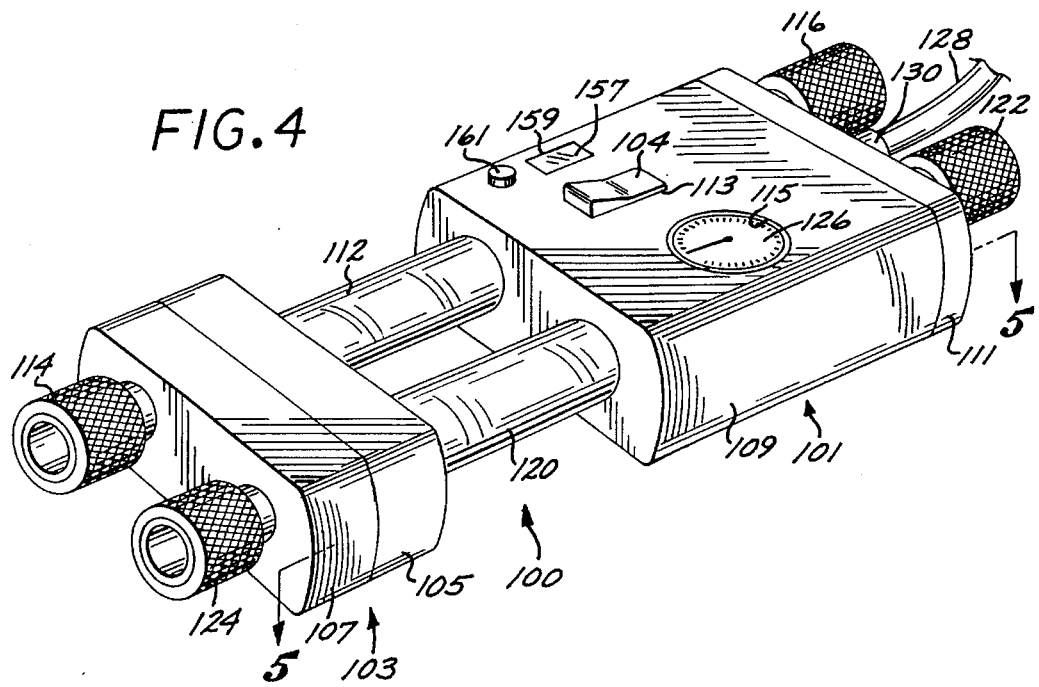
FIG. 4 is a perspective view of a second embodiment of the hand held transmission fluid changer of the present invention.

In the following detailed description, like reference numerals will be used to refer to like or corresponding elements in the different figures of the drawings. Referring now to the drawings, and particularly to FIGS. 1 and 2, there is shown generally a hand held transmission fluid changer 10 embodying the present invention. The hand held transmission fluid changer 10 comprises, generally, a rectangularly shaped, lightweight housing 12, housing a pair of internal fluid passageways defined by, respectively, elbow shaped drain and supply tubes 14 and 16 (FIG. 2). The respective tubes terminate at their respective ends in orthogonally disposed quick disconnect couplings 30, 32, 34 and 36 which project perpendicularly outwardly from the peripheral walls of the housing 12 thus allowing for external access to the respective tubes. The drain and supply tubes further include respective side-by-side transparent sight glasses 18 and 20 for observation of the color of the fluids flowing in the respective fluid tubes. A pair of flow control valves, generally designated 26 and 28, are incorporated in the respective orthogonal rims of such tubes to provide for manual manipulation of the flow rates through such tubes. A pressure gauge 22 is mounted between the drain valve 26 and sight glass 18 to sense and display the fluid pressure therein as established by the transmission pump. A digital display 24 is mounted on the top wall of the housing for viewing thereof and is connected to and manipulated by a flow meter 25 in the supply tube 16, such that the quantity of unused fluid flowed through the supply tube and into the transmission is measured and displayed to the operator.

Automatic transmissions typically include transmission fluid lines external to the transmission itself, such as transmission fluid cooler lines which extend between the transmission and the vehicle's radiator for the transmittal of such fluid to the radiator for the cooling and return thereof to the transmission. The transmission includes an internal transmission pump which flows heated fluid in the transmission through one of such cooler lines to the radiator where it is cooled and returned to the transmission via the other cooler line. As taught in U.S. Pat. No. 5,370,160 to Parker and shown in FIG. 6, one of these external cooler lines 69 may be disconnected to define an accessible fluid port downstream of the transmission fluid pump for removal of used fluid to a used fluid tank. The exposed radiator port 63 to which the cooler line normally connects is then utilized to define an upstream fluid port, upstream of the transmission fluid pump, for receipt of such unused fluid. When the transmission fluid pump is thereafter actuated, used fluid will be pumped from the downstream fluid port through a drain line to a disposal line. A fresh fluid line may be connected to the upstream fluid port and unused fluid pumped from a supply tank for the simultaneous introduction of unused fluid to the transmission. The present invention provides a compact device which may be normally stored in an elevated suspended position and which may conveniently be grasped and drawn into position for connection to such fluid ports to conveniently perform a simultaneous, complete exchange of fluid.

The housing 12 is generally rectangular in shape, constructed of metal or hard plastic and is about 6"×10" in top plan view, and 2" deep. It is in the form of a generally rectangular in cross section, open ended central tube section 35 capped at its opposite ends by respective end caps 23 and 13. The central tube section has formed medially in the top wall thereof a pair of parallel, longitudinally extending, laterally spaced apart rectangular slots 75 and 77 having a laterally extending, centrally disposed slot 73 disposed generally between the respective one ends thereof. Disposed centrally between the slots 75 and 77 is a circular window 79 for receipt of the pressure gauge 22 to provide for viewing thereof.

The respective drain and supply valves 26 and 28 include thumb wheels 38 and 40 oriented in a respective orthogonal plane to form upper sectors projecting upwardly through the respective slots 73 and 75. The display 24 is formed with a rectangular viewing lens disposed in the slot 77 (FIG. 1).

The top wall of the central tube section 35 is further formed at one end with an enlarged, generally square opening defining a window 19 having a lens 21 therein through which the sight glasses are viewed (FIGS. 1 and 2). Finally, such top wall is formed at the top end opposite such window, and to one side, with a small longitudinal rocker switch-receiving slot 81.

A plurality of bores 15, 17, 33 and 37 are formed on, respectively, the lateral side wall of the end cap 13, on the lateral side wall of the central tube segment 35, and on the end cap 23, such bores allowing for projecting the quick disconnect couplings 30, 32, 34, and 36 therefrom as described in more detail below.

The supply tube 16 comprises an elbow tube segment 27 and includes, in series, the sight glass 20, the flow meter 25 and the flow control valve 28 (FIG. 2). The supply tube terminates at one end in the supply inlet quick disconnect coupler 30 which projects through the bore 15 formed on the end cap 13 and terminates at its opposite end in the supply outlet quick disconnect coupler 34 which projects through the bore 17 formed on the end cap 23. The supply inlet may be conveniently accessed by a supply hose to flow unused fluid into the supply tube while the supply outlet may be accessed by an unused fluid hose to flow such unused fluid to an upstream transmission fluid port as described in greater detail below.

The drain tube 14 similarly comprises an elbow tube segment 31 and includes, in series, the sight glass 18, the drain flow control valve 26 and the pressure gauge 22 (FIG. 2). The drain tube terminates at one end in the drain outlet quick disconnect coupler 32 which projects through the bore 33 formed on the central tube segment 35 and terminates at its opposite end in the drain inlet quick disconnect coupler 36 which projects though the bore 37 formed on the end cap 23. Thus, the drain inlet may be accessed by a used fluid hose for conducting used fluid withdrawn from a downstream transmission fluid port to the drain tube while the drain outlet may be accessed by a drain hose for conducting used fluid from the drain tube to a remote waste oil tank as described in more detail below.

In the preferred embodiment, the couplings 30, 32, 34, and 36 comprise female quick disconnect couplings. It will be appreciated that the couplings may assume many forms such as male or female quick disconnects, bayonet mounts, threaded mounts, compression fittings and the like.

The sight glasses 18 and 20 comprise open ended, translucent tubes thus providing for the visual inspection of the fluid flowing through the drain and supply tubes 14 and 16 (FIGS. 1 and 2). As shown in FIG. 1, the respective sight glasses are disposed in a side-by-side configuration in the recess 19 formed on the central tube segment 35 and are fixedly connected in series with the respective tubes 14 and 16 for fluid flow therebetween. Thus, the operator may visually observe the color of the fluid being withdrawn from the transmission so that it may be determined when the fluid being withdrawn attains substantially the same color as unused transmission fluid thus providing an indication that there has been a full fluid exchange. In this regard, it will be appreciated that initially, the fluid flowing through the drain sight glass 18 as the exchange is commenced will typically have a brown tint as is characteristic of used fluid. When a quantity of used fluid has been pumped into the transmission to substantially displace the entire quantity of used fluid, the color of the fluid flowing through the drain sight glass 20 will attain a red tint as is characteristic of many types of unused transmission fluid thereby indicating substantially full displacement of the used fluid. It will be appreciated by those skilled in the art that this color change will occur when the quantity of unused fluid pumped into the transmission approaches 100% to 125% of the capacity of the transmission sump.

The pressure gauge 22 senses fluid pressure in the drain tube 14 as generated by the vehicle transmission pump (FIG. 2). The operator may then compare the pressure gauge reading (in psi) with the normal operating range of the transmission fluid pump specified in the owner's manual or the like to obtain a indication of the condition of the transmission itself.

The hand held transmission fluid changer of the present invention is intended to be used with different models of automobiles and thus with different transmissions so it will encounter different rates of flow as dictated by the flow characteristics of different flow paths and different transmission pumps. In addition different transmissions will present different internal flow resistances as presented by the internal componentry within such transmissions. Thus the flow control valves 26 and 28 are provided to allow the operator to match the respective rates of flow through the drain and supply tubes 14 and 16. In this embodiment such flow control valves include the respective thumb wheels 38 and 40 projecting through the top wall of the housing 12 (FIG. 1) to be manipulated by the operator's thumb. As such the respective flow control valves may be externally manipulated by an operator to either increase or decrease the rate at which fluid is withdrawn from or injected into the transmission thereby providing for the precise matching of flow rates of the used fluid from and unused fluid to the transmission regardless of the source pressure from the fluid supply, the internal flow resistance within a particular automatic transmission and likewise regardless of the particular transmission fluid pump in the transmission being serviced.

The digital display 24 is shown in the present embodiment electrically connected to the electric flow meter 25 disposed in the supply tube 16 to measure the quantity of fluid flowed through the supply tube for communication of such information to the digital display for display thereof, typically in terms of quarts or liters to give the operator an indication of the volume exchanged (FIG. 2). The digital display driven by the flow meter thus enables the operator to determine when the quantity of fluid added matches or exceeds the capacity of the transmission. The operator may observe the total quantity of fluid introduced to the transmission by observing the display and may determine when the fluid exchange process has been substantially completed by comparing that amount with the total fluid capacity of the transmission itself. When it is determined that the amount of fluid introduced to the transmission equals or exceeds by some set figure the fluid capacity of the transmission, the operator will know that substantially all the used transmission fluid has been replaced and may discontinue the fluid exchange process. It will be appreciated that initially the unused fluid introduced to the transmission will mix with and be somewhat contaminated by used fluid still stored within the transmission. Thus, in order to perform a substantially complete flush of the used fluid in a transmission, it is necessary to introduce a quantity of unused fluid exceeding the specified capacity of the transmission to be assured that the volume of fluid remaining in the transmission has been substantially totally exchanged. The flow meter and digital display serve to provide an indication of progress in this regard and afford an indication of the actual quantity of unused fluid consumed for billing purposes and the like.

A reset button 29 (FIGS. 1 and 2) is also provided and is electrically connected to the display device 24 for selectively resetting the display, such as before commencing a fluid exchange procedure.

An on-off solenoid valve 45 is included in the supply tube 16 and connected in series with the supply valve 28 and flow meter 25 (FIG. 2). The valve is normally closed to block fluid flow through the supply tube. Also connected in series with such solenoid valve is a toggle rocker 43 disposed in the slot 81 (FIG. 1) to be manipulated by the operator to control the on-off solenoid valve.

In the embodiment illustrated in FIGS. 1–3, the solenoid valve 45, digital display 24 and flow meter 25 are electrically actuated and thus require electrical power to operate. Thus a battery port may be formed on the housing 12 for receiving a battery source therein such as a 12 volt battery. The battery port includes electric leads connected in parallel to the digital display, solenoid valve and the flow meter for transmitting electrical power from the battery to such components (not shown).

The housing 12 and housed components have a combined weight of about five pounds and preferably no greater than twenty pounds for convenience of suspension from the reel and manipulation about during use.

Referring to FIG. 3, the hand held transmission fluid changer 10 of the present invention is connected at the supply inlet coupling 30 to a conventional supply hose 52, which serves to conduct fluid between a remote unused fluid tank 56 and the supply tube 16. The supply hose is typically connected for fluid communication with a conventional bulk supply conduit 50 connected in series with a single or double piston, 60 psi demand pump 58 typically employed to pump fluid from the unused fluid tank through such supply conduit. A double piston pump is preferably employed to provide smoother operation during the fluid exchange process. A pressure sensor is included in the supply conduit and is responsive to the pressures sensed in the supply conduit to, upon such pressure dropping below, for instance, 60 psi, generate a control signal to activate the supply pump. The supply hose 52 is shown partially wound during non-use of the apparatus about a conventional overhead reel assembly, generally designated 60, which is preferably fixedly attached to the ceiling of the service bay or the like. The reel assembly includes a conventional, internally biased spool 61 operative upon manipulation thereof to wind a portion of the supply hose thereon. Thus during periods of non-use the supply hose serves to suspend the hand held transmission fluid changer elevated to about eight feet above the floor in an out of the way manner as shown in FIG. 3.

The reel is formed centrally with a through bore serving as the central axis for the reel about which the reel may rotate and includes a conventional fluid rotary connector to transition from the bulk supply conduit 50 to the supply hose 52. The reel is suspended by a pair of triangularly shaped, spaced apart mounting brackets 62 and 64 formed at their respective lower ends with respective open ended bores for receipt of the conventional bearing assemblies mounting such reel for free rotation thereon. Such brackets terminate at their respective upper ends in respective outwardly turned mounting flanges 66 and 68 which may be bored to accept screws therein and thus fixedly mount the reel assembly to the ceiling of the service area or the like.

The reel assembly further includes an open ended outwardly projecting cylindrical sheath 70 projecting from the bracket 62 in axial alignment with the reel for projection therethrough of the bulk supply conduit 50 (FIG. 3).

With further reference to FIG. 3, the hand held transmission fluid changer 10 is normally suspended on the hose 52 from the reel 60 in an overhead retracted position and may be manually maneuvered into a more accessible position for use by grasping thereof and manipulation to draw the hose 52 from such reel. A drain hose 51 is provided to be releasably coupled at one end with the drain outlet coupling 32, the hose being in fluid communication at its opposite end to a remote waste fluid tank 54 thus serving to conduct used fluid from the drain tube 14 to the waste fluid tank (shown in phantom).

Figure 6:
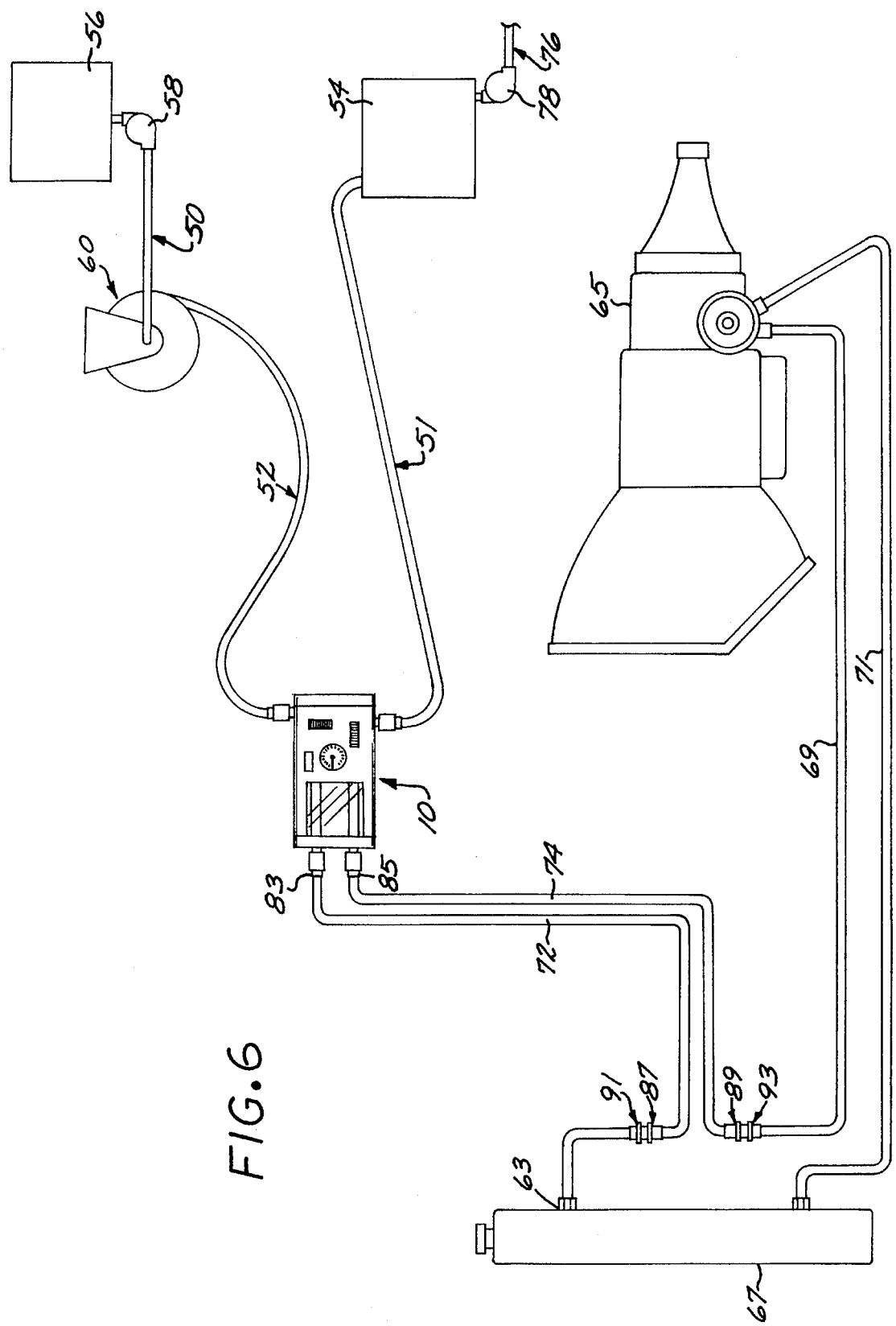
FIG. 6 is a schematic diagram of the hand held transmission fluid changer of the present invention with respective hoses appropriately connected thereto for performing a transmission fluid exchange.

Referring to FIG. 6, a used fluid hose 72 is provided to connect on one end to the drain inlet coupling 36 and on the opposite end to a downstream transmission component downstream of the automatic transmission pump such as the disconnected transmission cooler line 69 for the withdrawal of used fluid therefrom as described above. An unused fluid hose 74 is connected at one end to the supply outlet coupling 34 and at its opposite end to an upstream fluid port upstream of the transmission pump such as the cooler line port 63 on a vehicle radiator 67 for delivering unused fluid thereto as described above. Thus with the respective hoses connected as such a simultaneous transmission fluid exchange may be performed as described in more detail below.

It will be appreciated by those skilled in the art that different automobile manufacturers will design their respective automobiles differently. As such, the factory cooler lines and radiator ports for various automobiles will be formed differently and thus will have differently configured end couplings. Thus, a plurality of varyingly configured used and unused fluid hoses 72 and 74 may be provided which include uniformly configured first ends 83 and 85 for mating with the quick disconnect couplings 34 and 36 and which will be formed with varyingly configured second ends, generally designated 87 and 89, for mating with correspondingly configured end couplings, generally designated 91 and 93, of the respective cooler lines and radiator ports of different automobiles. By way of example, the second ends of the respective fluid lines may be formed with threaded end fittings of varying sizes, with straight male fittings of varying sizes, with female fittings of varying sizes, or with variously configured compression fittings for mating with the respective cooler lines and radiator ports of different automobiles.

With reference to FIG. 3, the waste fluid tank 54 further has connected to the bottom end thereof one end of a disposal hose, generally designated 76, for removal of waste fluid from the waste fluid tank. The disposal hose has connected in series therewith a disposal pump 78 for draining waste fluid from the waste fluid tank through the disposal hose. The disposal hose includes a free opposite end for releasable connection to a bulk tank of a disposal truck or the like for transfer of the waste fluid from the waste fluid tank to the disposal truck (not shown).

In use, the hand held transmission fluid changer 10 may be conveniently stored during periods of non-use such that it does not interfere with the available work area in a service bay or the like and may be quickly and easily retrieved for use thereof. When the hand held transmission fluid changer is to be used, the operator may simply grasp the housing 12 and pull such changer downwardly, resulting in the application of an external force to the reel 61 which serves to rotate the reel thus paying out the supply hose 52 as the operator maneuvers the changer into position for efficient use thereof as shown in phantom in FIG. 3. The operator may then connect the free end of the drain hose 51 to the drain outlet coupling 32 and connect the respective first ends of the appropriate unused and used hoses 72 and 74 with the appropriately configured second end couplings to the drain inlet coupling 36 and supply outlet coupling 34 and the respective second ends of such hoses to the correspondingly configured cooler line and radiator port of the vehicle to be serviced.

The operator may then start the vehicle engine, resulting in the operation of the transmission fluid pump and thus initiation of fluid flow through the transmission fluid circuit. Such fluid will be directed through the disconnected cooler line into the used fluid hose 72 for conduction thereof through the drain inlet coupling 36 into to the drain tube 14. The fluid in the drain tube will flow through the sight glass 18 where the operator may inspect the color of the fluid being withdrawn from the transmission. The pressure generated by the particular pump of the transmission being serviced and communicated in the drain tube is sensed by the pressure gauge 22. This transmission pump pressure may be compared with the pressure specified for normal operation of the transmission to obtain an indication of the condition of the transmission. The used fluid will then be flowed through the drain outlet coupling 32 and into the drain hose 51 for transmittal thereof to the waste fluid tank 54.

The operator may, simultaneous with the actuation of the transmission fluid pump, actuate the demand pump 58 resulting in the flow of unused fluid through the supply hose 52 and into the supply tube 16. Because the solenoid valve 45 is initially closed, fluid will not initially flow through the supply tube. Thus the pressure in the supply hose will build to reach a predetermined pressure causing the pressure sensor to generate a signal to deactivate the pump. Then, the operator can flip the on-off switch 43 to thereby open the solenoid valve and thus the fluid path through the supply tube, such that a reduced pressure in the supply tube results and is sensed by the sensor. The sensor will then generate a second electric signal to be communicated to the motor of the demand pump to actuate the pump to maintain the pressure in the supply tube during the fluid exchange process.

Once the on-off switch is switched on, with the supply valve 28 open, unused fluid will flow through the sight glass 20 and out the unused fluid hose 74 into the downstream port of the transmission fluid circuit, thereby performing a simultaneous exchange of transmission fluid in the transmission. The flow meter 25 measures the amount of unused fluid flowed through the supply tube and communicates such information in the form of a corresponding electrical signal to the digital display 24 for display thereof to the operator.

During the fluid exchange process, the operator may adjust and match the respective flow rates to and from the transmission by adjusting the respective thumb wheels 38 and 40 thus serving to either open or close the respective flow control valves 26 and 28 to arrive at equal flow rates. For particular applications, it may be possible to achieve the desired balance of inlet and outlet flow rate by relying on adjustment of just one such valve, for instance the supply valve 28.

When it is determined that the fluid exchange process has been completed, by either observing the respective colors of fluid flowing through the respective sight glasses 18 and 20, or by observing the quantity of unused fluid delivered to the transmission as measured by the flow meter 25 and displayed by the digital display 24, the operator may deactivate the demand pump and vehicle engine thereby ceasing the flow of used fluid from and unused fluid to the transmission. The used and unused fluid hoses 72 and 74 may then be disconnected from the respective upstream and downstream ports of the transmission fluid system and the drain hose 51 may be disconnected from the drain outlet coupling 32. The operator may then manipulate the hand held transmission fluid changer to release the brake in the reel 61 to cause it to retract the supply hose 52 about the reel thereby retracting the hand held transmission fluid changer to its elevated stored position as shown in FIG. 3.

When the remote waste fluid tank 54 is filled with waste fluid and it becomes desirable to drain such waste fluid, the free end of the disposal tube 76 may be connected to a waste tank on a disposal truck or the like and the disposal pump 78 actuated to drain the waste fluid from such tank through the disposal tube and into the waste tank (not shown).

Figure 5:
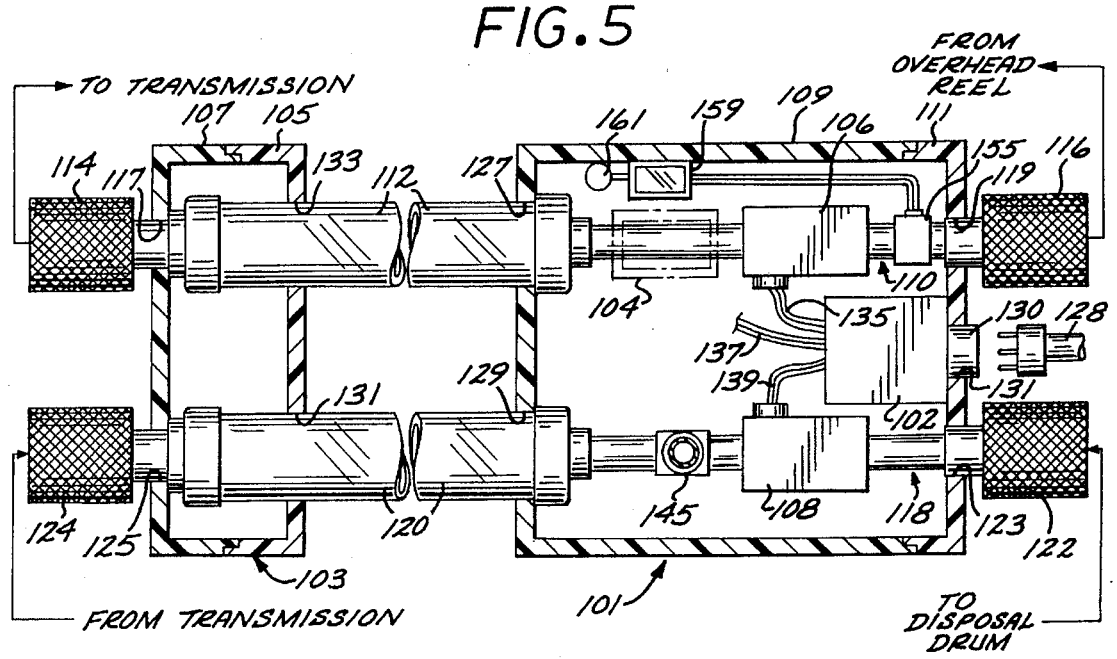
FIG. 5 is a broken horizontal sectional view, in enlarged scale and partially in phantom, taken along the line 5—5 of FIG. 4.

Referring to FIGS. 4 and 5, there is shown a second embodiment of the hand held transmission fluid changer of the present invention. In the second embodiment, the changer, generally designated 100, includes a segmented housing comprising a large housing 101 and a small housing 103 carried on opposite ends of respective plexiglass sight tubes 112 and 120 and further comprising, in place of the manual flow control valves 26 and 28 in the embodiment of FIGS. 1–3, control circuitry 102 such as a programmed logic controller (PLC) such as those available from various manufacturers, such as Omega Manufacturing of Stamford, Conn., or Allen Bradley of Milwaukee, Wis. In practice, the PLC 102 will be in the form of a small logic chip programmed with the desired logic to control an electric flow control valve 106 in response to the sensed rate of, if desired, accumulated volume of flow through an electric flow meter 108. The PLC is formed with a plurality of ports for electrical connection to, respectively, an on-off switch having a toggle rocker 104, the first flow meter 108, and the electrically actuated flow control valve 106 by means of respective electrical leads 135, 137 and 139.

The housing 103 is formed by a pair of opposing halves 105 and 107. The half 105 has formed on the end wall thereof a pair of laterally spaced apart bores 131 and 133 for extension therethrough of a segment of the respective sight glasses 112 and 120. The half 107 likewise has formed on the end wall thereof a pair of laterally spaced apart bores 117 and 125.

The housing 101 includes an open ended box 109 capped by an end cap 111 and houses the flow meter 108, the electrically actuated flow control valve 106, the on-off switch and toggle rocker 104, a second flow meter 155 and a pressure sensor 145 therein. Formed in the top wall of the box 109 are a pair of longitudinally projecting, laterally spaced apart slots 113 and 157 disposed to one side and a circular cut out 115 on the other. A pressure gauge 126 in electrical communication with the pressure sensor is placed into the circular cut out to provide for observation thereof. The toggle rocker projects through the bore 113, and a digital display 159 driven by the second flow meter 155 is disposed in the bore 157.

The end cap 111 has formed on the end wall thereof a pair of laterally spaced apart bores 119 and 123. The open ended box 109 is likewise formed at its closed end with a pair of laterally spaced apart bores 127 and 129.

A drain tube assembly, generally designated 118, is housed in the housing 101 and includes, in series, the electrically actuated flow meter 108 and pressure sensor 145 and connects at one end thereof with the sight glass 120 which includes a first end which extends through the bore 129 formed on the closed end of the box 109. The other end of the drain tube connects with a quick disconnect coupler 122 which projects perpendicularly outwardly from the end cap 111 through the bore 123 formed on such cap.

A supply tube assembly, generally designated 110, is also housed in the housing 101 and includes, in series, the second flow meter 155 and the electrically actuated flow control valve 106. The second flow meter is electrically connected to and thus drives the display device 159 which serves to display either the quantity of unused fluid flowed through the supply tube or the flow rate through such tube, typically in liters or quarts. The supply tube connects at one end thereof to the sight glass 112 which includes a first end which extends through the bore 127 formed on the closed end of the box 109. The supply tube connects at the opposite end thereof to a quick disconnect coupler 116 which projects perpendicularly outwardly from the end cap 111 through the bore 119 formed thereon.

The sight glasses 112 and 120 include respective first ends which extend through the bores 127 and 129 formed on the closed end of the box 109, and further include respective second ends which extend inwardly through the bores 131 and 133 formed on the half 105 to connect with respective quick disconnect couplers 114 and 124 which project perpendicularly outwardly from the end wall of the half 107 through the respective bores 117 and 125 formed thereon.

The PLC 102 is programmed for receiving an electrical signal from the flow sensor 108 proportional to the rate of flow of used fluid through the drain tube 118 and for electrically outputting a corresponding control signal for adjusting the flow control valve 106 in the supply tube 110 a selected amount to adjust flow in the respective tube and thereby match the rate of flow in the supply tube with the rate in the drain tube as created by the transmission pump. The on-off switch 104 is provided to selectively empower the circuitry to perform the flow rate matching process. An external power cord 128 includes a plug releasably plugged into a socket formed in the end of an electrical fitting 130 projecting through a bore 131 formed on the end cap 111 to distribute electrical power to the electric elements of the hand held transmission fluid changer. In practice, the changer includes a 12 volt power source in place of the electrical connectors.

Thus, in use either the 12 volt battery is inserted or the power cord 128 connected to the power fitting 130 and the appropriate hoses connected to the respective drain and supply inlet and outlet couplings as in use of the first embodiment set forth above with respect to FIGS. 1–3 and the transmission and demand pump (not shown) simultaneously actuated. The operator may then turn the switch to its "ON" position thereby transmitting electric power to the control circuitry 102 to energize such circuitry. The flow meter 108 then senses the flow rate in the drain tube to generate a proportional electrical signal to the PLC where it is processed to produce a corresponding control signal to the flow control valve 106 to open such valve to the degree dictated by the sensed signal to thus match the flow rate through the supply tube with the rate through the drain tube so that a simultaneous exchange of transmission fluid will be automatically performed. This then allows for automatic adjustment to achieve balanced flow. The second flow meter 155 in one mode measures the amount of unused fluid flowed through the supply tube and communicates such information to the display 159 for displaying the amount of unused fluid flowed through the supply tube, typically in quarts or liters, to the operator. A reset button 161 is provided and is electrically connected to the display for selectively resetting such display before each use of the fluid changer (FIGS. 4 and 5).

From the foregoing, it will be appreciated that the hand held transmission fluid changer of the present invention is lightweight, compact and convenient to use and will perform a substantially complete, simultaneous exchange of transmission fluid and can conveniently be stored when not in use.

While several forms of the invention have been illustrated and described, it will also be apparent that various modifications can be made without departing from the spirit and scope of the invention. Accordingly, it is not intended that the invention be limited, except as by the appended claims.

What is claimed is:

1. A hand held transmission fluid changer for connection with a pressurized unused fluid supply hose, a disposal hose, an unused fluid hose and a used fluid hose and comprising:

a hand held housing for connection with said supply hose and formed with an interior compartment;

supply and drain robes in said housing and projecting at their respective opposite ends therefrom to form, respectively, a supply inlet and outlet and a drain inlet and outlet;

respective supply inlet and outlet couplings at the respective said supply tube inlet and outlet for connection, respectively, with said supply hose and transmission unused fluid hose;

respective drain inlet and outlet couplings at the respective said drain tube inlet and outlet for connection with the respective said transmission used fluid hose and disposal hose; and a flow control valve in one of said tubes for controlling flow therethrough whereby said supply inlet coupling may be coupled with said supply hose, said drain outlet coupling coupled with said disposal hose, said supply outlet coupling coupled with said unused fluid hose, said drain inlet coupling coupled with said used fluid hose to flow pressurized unused fluid from said supply tank to said unused fluid hose and flow used fluid from said used fluid hose to said drain hose while said valve is adjusted to balance the flow rates in said supply and drain tubes.

2. The fluid changer of claim 1 wherein:

said valve is in said supply tube.

3. The fluid changer of claim 1 wherein:

said housing, tubes, valves and couplings weigh less than 20 pounds.

4. The fluid changer of claim 1 wherein:

said housing is formed with a window; and said tubes include respective sight glasses confronting said window.

5. The fluid changer of claim 1 wherein said housing is formed with a pair of slots and that includes:

a pair of control valves for controlling the rate of flow through the respective said tubes and including respective thumb control wheels projecting through the respective said slots for manipulation to control said valves.

6. The fluid change of claim 1 wherein:

said couplings are in the form of quick disconnect couplings.

7. The fluid changer of claim 1 wherein:

said housing is configured, in top plan view, with a size of substantially 6 inches×10 inches.

8. The fluid changer of claim 1 adapted to balance fluid flow in said one of said tubes with the flow in the other of said tubes and that includes:

a flow rate sensor in said other of said tubes and responsive to the rate of flow through said other of said tubes to generate a predetermined signal proportional to said flow rate;

an electrical controller in electrical communication with said sensor and responsive to said predetermined signal to generate a control signal; and an electrical actuator in electrical communication with said controller and said flow control valve and responsive to said control signal to control said valve to maintain the flow in said one tube at substantially the same rate as that sensed by said sensor in said other tube.

9. The fluid changer of claim 1 wherein:

said control valve is in said supply tube and further including:

a flow sensor in said drain tube and operative in response to the magnitude of flow therethrough to generate a proportional predetermined electrical signal; and an electrical control device connected with said sensor and said control valve and responsive to said predetermined electrical signal to proportionately control said valve to maintain the flow in said supply tube at substantially the flow rate in said drain tube.

10. The fluid changer of claim 9 wherein:

said electrical control device comprises a programmed logic controller.

11. The fluid changer of claim 1 further including:

an electrical meter connected to said supply tube and responsive to the quantity of fluid flowed therethrough to produce an electrical signal; and a display device mounted on said housing and connected in electrical circuit with said electrical meter and responsive to said electrical signal to indicate the cumulative amount of unused fluid flowed through said supply tube.

12. An automatic transmission fluid changer system for installation in a car bay for servicing a transmission of a car parked therein of the type having a transmission pump upstream connection and a downstream connection, said system comprising;

a bulk supply tank;

a pump for pressurizing fluid from said supply tank;

a supply hose for mounting on one end to said bay and formed with a manipulation length leading to a free end having a supply hose coupling thereon;

a supply conduit connected between said supply tank and said one end of said hose;

a bulk waste fluid tank remote from said bay;

a drain hose leading from said waste fluid tank and including on its free end a waste fluid coupling;

a portable, hand held, changer including a housing configured to be grasped by hand and manipulated about, respective supply and drain tubes in said housing and including at their opposite ends respective supply inlet and outlet couplings and drain inlet and outlet couplings, said supply inlet coupling releasably couplable with said supply hose coupling and said drain outlet coupling releasably couplable with said waste fluid coupling, said system further including:

a transmission supply hose for connection on one end with said transmission upstream connection and including on its opposite end a transmission supply hose inlet coupling for coupling with said supply outlet coupling; and a transmission drain hose for connection on one end with said transmission downstream connection and including on its opposite end a transmission drain hose outlet coupling for connection with said drain inlet coupling.

13. The fluid changer system of claim 12 wherein:

said tubes include respective sight glasses to provide for visual observation of the fluid in the respective said tubes.

14. The fluid changer system of claim 12 further including:

a pressure gauge mounted on said housing and connected to said drain tube for measuring and displaying the pressure in said drain tube.

15. The fluid changer system of claim 12 further including:

a flow meter connected to said supply tube for measuring the amount of fluid flowed through said supply tube; and a display device mounted on said housing and connected to said flow meter for communication therewith for indicating the cumulative amount of unused fluid flowed through said supply tube.

16. The fluid changer system of claim 12 further including:

a flow control valve in said drain tube for adjusting the rate of flow through said tube.

17. The fluid changer system of claim 12 that includes:

a retractable reel winding said supply hose thereon and of sufficient structural integrity to support said changer.

18. A hand held transmission fluid changer for connection with a pressurized unused fluid supply hose, a disposal hose, an unused fluid hose and a used fluid hose and comprising:

a hand held housing for connection with said supply hose and formed with an interior compartment;

supply and drain tubes in said housing and projecting at their respective opposite ends therefrom to form, respectively, supply inlet and outlet ends and drain inlet and outlet ends; and a flow control valve in one of said tubes for controlling flow therethrough whereby said supply inlet end may be coupled with said supply hose, said drain outlet end coupled with said disposal hose, said supply outlet end coupled with said unused fluid hose, said drain inlet end coupled with said used fluid hose to flow pressurized unused fluid from said supply tank to said unused fluid hose and flow used fluid from said used fluid hose to said drain hose while said valve is adjusted to balance the flow rates in said supply and drain tubes.

19. The fluid changer of claim 18 adapted to balance fluid flow in said one of said tubes with the flow in the other of said robes and that includes:

a flow rate sensor in said other of said tubes and responsive to the rate of flow through said other of said tubes to generate a predetermined signal proportional to said flow rate;

an electrical controller in electrical communication with said sensor and responsive to said predetermined signal to generate a control signal; and an electrical actuator in electrical communication with said controller and said flow control valve and responsive to said control signal to control said valve to maintain the flow in said one tube at substantially the same rate as that sensed by said sensor in said other tube.

20. The fluid changer of claim 18 wherein:

said control valve is in said supply tube and further including:

a flow sensor in said drain tube and operative in response to the magnitude of flow therethrough to generate a proportional predetermined electrical signal; and an electrical control device connected with said sensor and said control valve and responsive to said predetermined electrical signal to proportionately control said valve to maintain the flow in said supply tube at substantially the flow rate in said drain tube.

* * * * *

UNITED STATES PATENT AND TRADEMARK OFFICE
CERTIFICATE OF CORRECTION

PATENT NO. : 5,535,849

DATED : July 16, 1996

INVENTOR(S) : Jeffrey P. Few

It is certified that error appears in the above-identified patent and that said Letters Patent is hereby corrected as shown below:

Column 14, line 67, delete "robes" and insert --tubes--.

Signed and Sealed this

Thirty-first Day of December, 1996

Attest:

BRUCE LEHMAN

*Attesting Officer*  *Commissioner of Patents and Trademarks*